United States Patent

[11] 3,579,110

[72] Inventor Erwin J. Hauber
1316 Lindenwood Drive, El Cajon, Calif. 92021
[21] Appl. No. 761,143
[22] Filed Sept. 20, 1968
[45] Patented May 18, 1971

[54] DIGITAL DATA CONDENSATION SYSTEM
4 Claims, 5 Drawing Figs.

[52] U.S. Cl. 325/47, 178/66, 179/15, 325/30
[51] Int. Cl. H04j 3/04
[50] Field of Search 179/15 LL, 15 sig; 340/150, 155, 156, 184, 147; 178/50, 66, 67, 69.5, 51; 325/30, 65, 45, 47

[56] References Cited

UNITED STATES PATENTS 2,977,417 3/1961 Doelz et al. 178/51
3,038,029 6/1962 Carberry 178/66X
3,128,343 4/1964 Baker 178/67
3,409,831 11/1968 Walker 325/65
3,479,457 11/1969 Oswald 178/67

*Primary Examiner*—Robert L. Griffin
*Assistant Examiner*—Benedict V. Safourek
*Attorney*—Richard K. Mac Neill

ABSTRACT: A digital data condensation system for simultaneously transmitting and receiving a plurality of digital data signals on a bandwidth which normally accommodates only one such signal by sequentially converting the intelligence of a plurality of binary codes into a plurality of fixed frequencies and phases; transmitting a carrier frequency modulated by the plurality of fixed frequencies and phases; receiving and detecting the fixed frequencies and phases; reconverting the fixed frequencies and phases into binary intelligence by comparing the received fixed frequencies and phases with fixed frequencies and phases synchronously generated in the receiver and reading out of original binary intelligence.

Patented May 18, 1971

3,579,110

4 Sheets-Sheet 1

INVENTOR.
ERWIN J. HAUBER

BY

Richard K. Macneill

INVENTOR.
ERWIN J. HAUBER
BY
Richard K. Macneill

INVENTOR.
ERWIN J. HAUBER
BY
Richard K. Macneill

INVENTOR
ERWIN J. HAUBER
BY
Richard K. Macneill

DIGITAL DATA CONDENSATION SYSTEM

BRIEF DESCRIPTION OF THE INVENTION

The present invention relates to a digital data condensation system and more particularly to a digital data condensation system in which digital information is converted to a plurality of fixed frequencies and phases and transmitted as such and received and converted into digital information.

According to the invention, a plurality of binary digital information is stored in a plurality of multidigit storage registers which are sequentially read out and presented to a plurality of logic gates each coded to pass a specific binary code group. The code group corresponding to the logic gate, which is specifically coded for that incoming signal, will then unlock an oscillator generating a specific frequency which, in turn, is passed into a phase shift network having a plurality of outputs with specific relative phases. A plurality of logic gates is coupled to each output of the phase shift network which is gated also by the incoming digital signals allowing only one phase to pass. The output of this logic gate will then be a specific frequency with specific phase which is then heterodyned and broadcast as modulation on a carrier. Each of the oscillators has a separate corresponding phase shift network with corresponding logic gates at its outputs resulting in transmissions carrying intelligence of different frequencies and different phases. In actual practice, several of the systems described above would be fed as modulation frequencies into the same transmitter simultaneously.

At the receiving end, the intelligence signals are received together with a reference frequency generated in the transmitter which is utilized to synchronize oscillators in the receiver of the same frequency as the fixed frequency oscillators in the transmitter. The frequencies generated by the oscillators in the receiver are likewise each passed through a phase shift network each having outputs comparable to the outputs of the phase shift network in the transmitter. The received signal intelligence is converted into pulses which are applied to coincidence gates where they are compared with the outputs of the phase shift networks which are also converted into pulses. The coincidence gates will yield outputs whenever there is any area of coincidence between their two inputs which outputs are integrated and passed through a level detector such as a Schmidt trigger. The output having the maximum area of coincidence will reach the critical level of the level detector first, the output of which inhibits the other level detector outputs and is utilized to generate a specific binary code which will correspond to the particular phase shift network output and also will correspond to the same binary code which started the whole sequence. This, in turn, is stored in a multiple digit storage register which, in turn, is sequentially read out in synchronism with the sequential read out of the storage registers of the transmitter.

Through the conversion of digital intelligence into frequency and phase intelligence, a condensation of bandwidth requirements for any given signal is achieved resulting in a typical case of a condensation factor of 4 or 6, i.e., 4 to 6 signals can be broadcast in the normal bandwidth requirements of one signal.

An object of the present invention is the provision of a digital data condensation system for transmitting and receiving a plurality of intelligence signals in the bandwidth conventionally allowing for one signal.

Another object of the present invention is the provision of a digital data condensation system which has a novel means for converting binary intelligence into frequency and phase intelligence.

Another object of the present invention is the provision of a digital data condensation system having a novel means for converting frequency and phase information into binary intelligence.

A further object of the invention is the provision of a digital data condensation system which is simple in operation and utilizes conventional components.

Other objects and many of the attendant advantages of this invention will be readily appreciated as the same becomes better understood by reference to the following detailed description when considered in connection with the accompanying drawings in which like reference numbers designate like parts throughout the FIGS. thereof and wherein.

DETAILED DESCRIPTION OF THE DRAWINGS

Figures 1, 2:
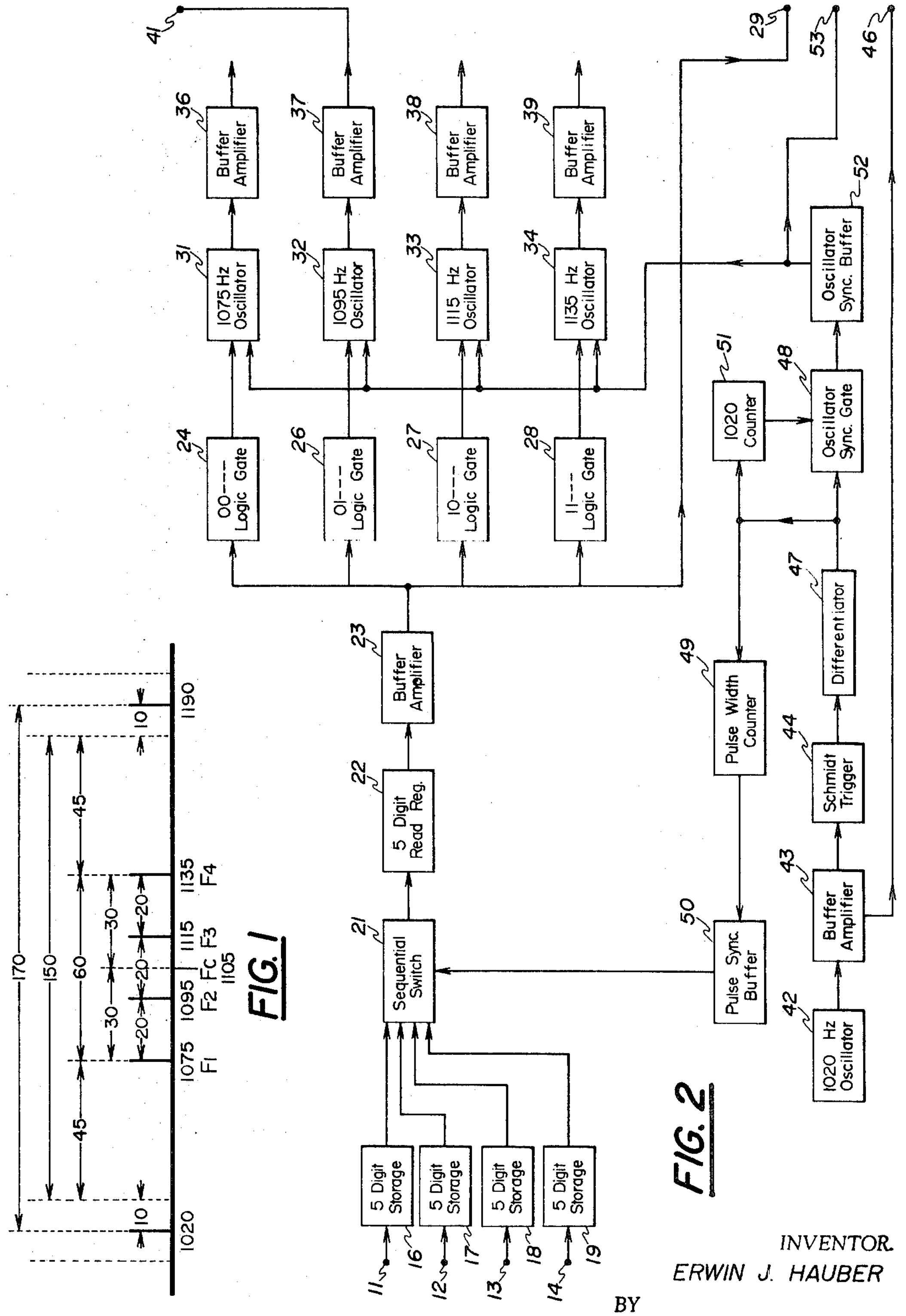
FIG. 1 represents the frequency allocations of a typical teletype channel as used in the present invention.
FIG. 2 shows a first part in block diagram form of the transmitter portion of the present invention.

Referring to FIG. 1, a typical teletype channel frequency allocation is shown having 1,020 Hz. at its lower edge, 1,190 Hz. at its upper edge and 1,105 Hz. at its center frequency. Other frequencies indicated are 1,075 Hz., 1,095 Hz., 1,115 Hz. and 1,135 Hz. The separation in Hz. are also indicated between the major frequencies.

Referring to FIG. 2, terminals 11, 12, 13 and 14 are coupled to the input of five-digit storage registers 16, 17, 18 and 19, respectively. The output of five-digit storage registers 16, 17, 18 and 19 are coupled to inputs of sequential switch 21. The output of sequential switch 21 is connected to the input of a five-digit read register 22, the output of which is coupled through buffer amplifier 23 to the input of logic gates 24, 26, 27 and 28, respectively, and to terminal 29.

The outputs of logic gates 24, 26, 27 and 28 are coupled to the inputs of oscillators 31, 32, 33 and 34, respectively, the outputs of which are coupled to buffer amplifiers 36, 37, 38 and 39, respectively. The output of buffer amplifier 37 is coupled to terminal 41.

The 1,020 Hz. oscillator 42 has an output coupled through buffer amplifier 43 to Schmidt trigger 44 and to terminal 46. The output of Schmidt trigger 44 is coupled through differentiator 47 to oscillator synchronizing gate 48, pulse width counter 49 and 1,020 counter 51, the output of which is also coupled to oscillator synchronizing gate 48. The output of oscillator synchronizing gate 48 is coupled through oscillator synchronizing buffer 52 to terminal 53 and oscillator 31, 32, 33 and 34. The output of pulse width counter 49 is coupled through pulse synchronizing buffer 51 to sequential switch 21.

Figure 3:
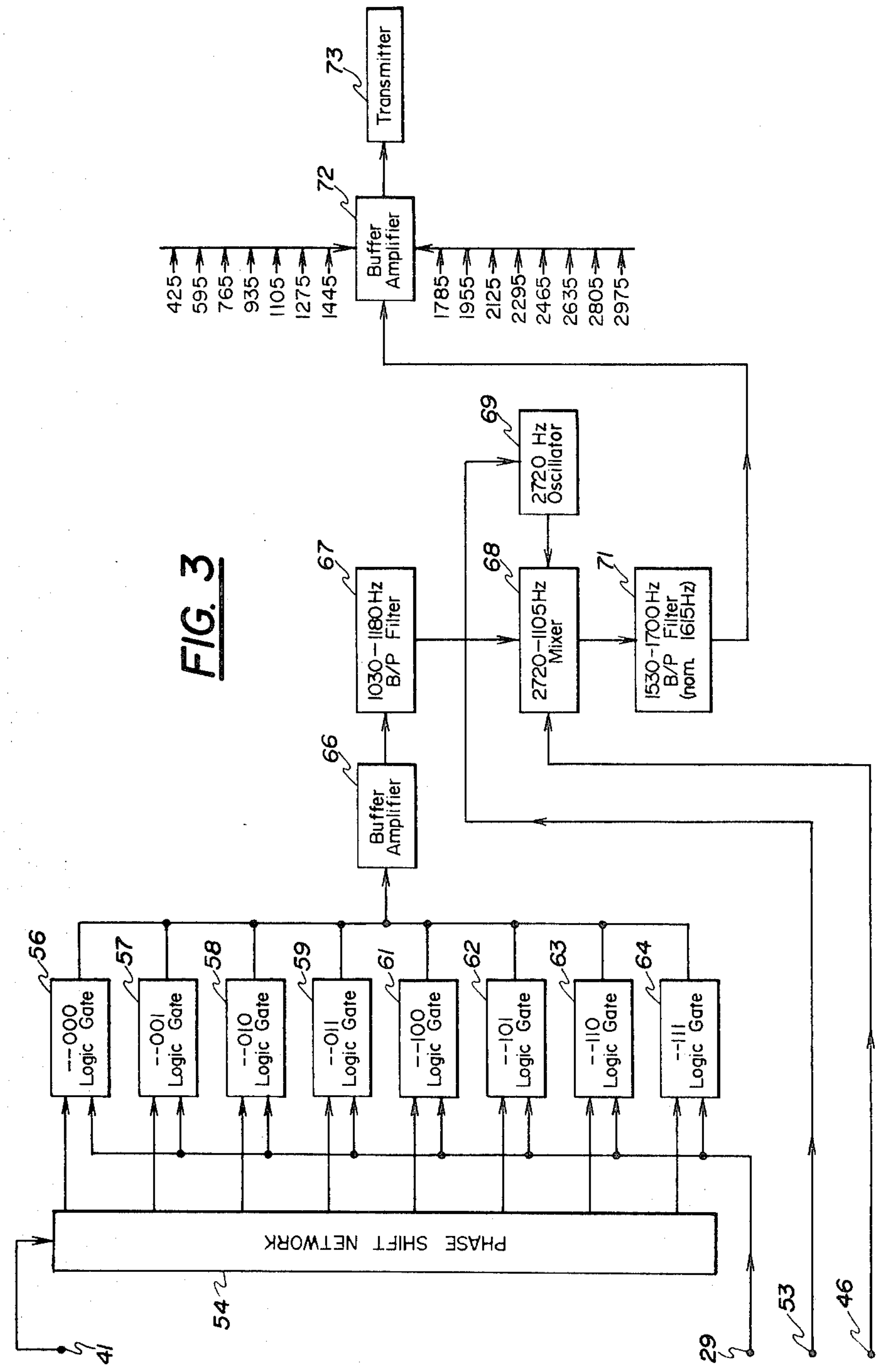
FIG. 3 shows a second part in block diagram form of the transmitter portion of the present invention.

Referring to FIG. 3, terminal 41 is coupled to an input of phase shift network 54 which has outputs coupled to logic gates 56, 57, 58, 59, 61, 62, 63 and 64, respectively. Terminal 29 is also coupled to second inputs of logic gates 56, 57, 58, 59, 61, 62, 63 and 64. The outputs of logic gates 56, 57, 58, 59, 61, 62, 63 and 64 are all coupled through buffer amplifier 66 and band-pass filter 67 to mixer 68. Terminal 53 is coupled to oscillator 69, the output of which is coupled to another input of mixer 68. Terminal 46 is coupled to another input of mixer 68, the output of which is coupled through band-pass filter 71 and buffer amplifier 72 to transmitter 73.

Figure 4:
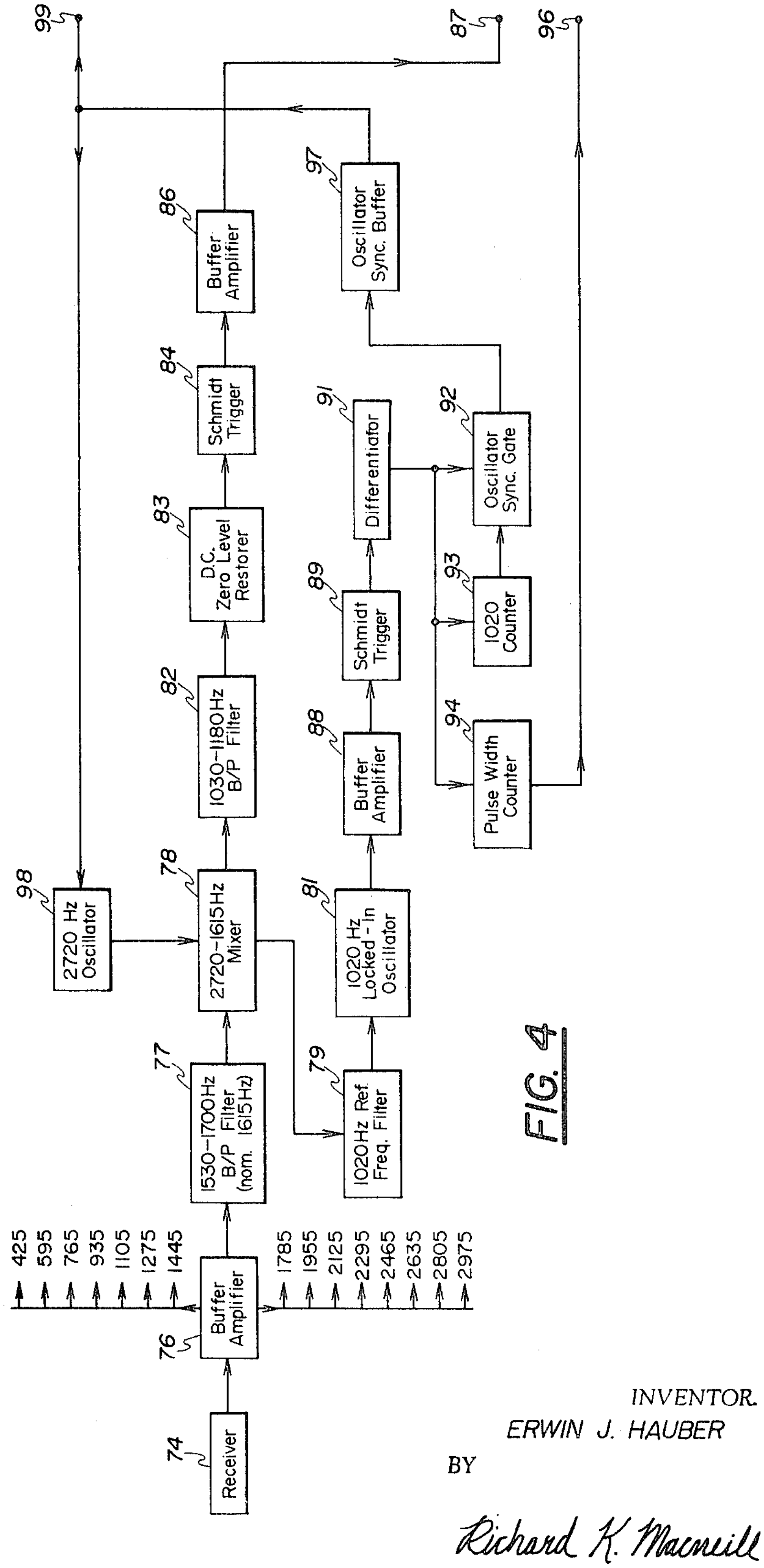
FIG. 4 shows in block form a first part of a receiver portion of the present invention.

Referring to FIG. 4, receiver 74 has an output coupled through amplifier 76 and band-pass filter 77 to mixer 78. Mixer 78 has one output coupled through filter 79 to oscillator 81 and another output coupled through filter 82 and DC zero level restorer 83 to Schmidt trigger 84. Schmidt trigger 84 has an output coupled through buffer amplifier 86 to terminal 87.

Locked-in oscillator 81 has an output coupled through buffer amplifier 88 to Schmidt trigger 89, the output of which is coupled through differentiator 91 to oscillator synchronizing gate 92, 1,020 counter 93, and pulse width counter 94. The output of pulse width counter 94 is coupled to terminal 96. The output of oscillator synchronizing gate 92 is coupled through oscillator synchronizing buffer 97 to oscillator 98 and terminal 99.

Figure 5:
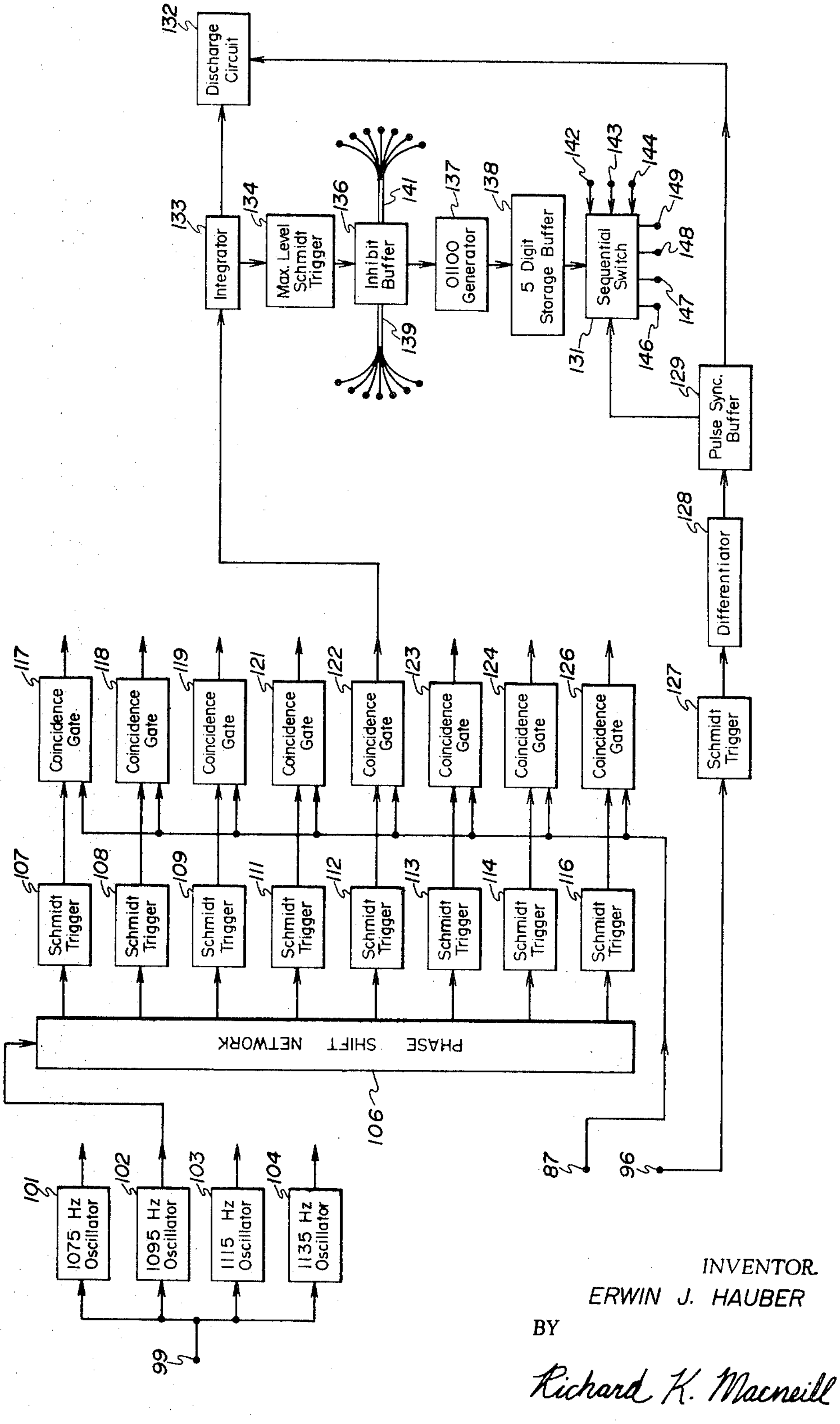
FIG. 5 shows in block form a second part of the receiver portion of the present invention.

Referring to FIG. 5, terminal 99 is coupled to the inputs of oscillators 101, 102, 103 and 104. The output of oscillator 102 is coupled to the input of phase shift network 106 having a plurality of outputs coupled to Schmidt triggers 107, 108, 109, 111, 112, 113, 114 and 116, respectively. The outputs of Schmidt triggers 107–116 are coupled to coincidence gates 117, 118, 119, 121, 122, 123, 124 and 126, respectively.

Terminal 87 is coupled to a second input of each of coincidence gates 117–126. Terminal 96 is coupled to Schmidt trigger 127, the output of which is coupled through differentiator 128 to pulse synchronizing buffer 129. The outputs of pulse synchronizing buffer 129 is coupled to sequential switch 131 and discharge circuit 132. The output of coincidence gate 122 is coupled to integrator 133 which is coupled to the input of discharge circuit 132. The output of integrator 133 is coupled to level detector 134, the output of which is coupled through inhibit buffer 136 to binary code generator 137. The output of binary code generator 137 is coupled to five-digit storage buffer register 138, the output of which is coupled to an input of sequential switch 131.

Input buffer 136 has seven inputs and seven outputs as indicated by the fanned leads coming out of cables 139 and 141, respectively. Sequential switch 131 has inputs 142, 143 and 144, and outputs 146, 147, 148 and 149.

OPERATION

The present invention was designed primarily for condensing digital data in a typical digital communication system. As a specific illustration, the present invention can be applied to a teletype system for simultaneous transmission of adjacent channels as fixed frequencies with specific phases, each representing a different five-digit binary code. In a conventional teletype channel, there is an 85 Hz. separation of mark/space frequencies. In this invention, it is noted that with a center frequency of 1,105 Hz., four information frequencies or subfrequencies are separated by 20 Hz. increments. These would be 1,075 Hz., 1,095 Hz., 1,115 Hz. and 1,135 Hz. In addition to these four subfrequencies, which are used for transmission of information pulses, a constant amplitude reference frequency of 1,020 Hz. is also included at the lower edge of the channel. The 1,190 Hz. signal is shown in FIG. 1 and is used as the reference frequency for the adjacent channel next higher in frequency. The reference frequency has a low amplitude since high Q filters can be used to amplify the frequency and lock in a reference oscillator as will be shown below.

Referring to FIG. 2, four separate teletype transmitters (not shown) are coupled to terminals 11, 12, 13 and 14 of five-digit storage registers 16, 17, 18 and 19. These inputs consist of standard teletype binary signals which have a start pulse, five information pulses, and a stop pulse. The five information pulses are stored in the corresponding five-digit storage registers. Sequential switch 21 reads out each of the storage registers sequentially and transmits the five information digits to the five-digit read register 22. Buffer amplifier 23 couples the output from five-digit read register 22 to the inputs of logic gates 24, 26, 27 and 28. The first two binary digits in the five-digit read register actuate the logic gate which controls the subfrequency oscillator outputs i.e., if the first two digits of a typical binary code are 01, logic gate 26 will be actuated which, in turn, will actuate or remove an inhibit output to 1,095 Hz. oscillator 32. This would correspond to frequency $F_2$ of FIG. 1. The outputs of the other oscillators 31, 33 and 34 remain blocked by logic gates 24, 27 and 28, respectively. The output of 1,095 Hz. oscillator 32 is then coupled through buffer amplifier 37 to terminal 41 of FIGS. 2 and 3.

Terminal 41 of FIG. 3 is then coupled to the input of phase shift network 54 which produces at its outputs eight phases of 0°, 45°, 90°, 135°, 180°, 225°, 270° and 315° with respect to the input phase. These outputs are coupled to logic gates 56, 57, 58, 59, 61, 62, 63 and 64, respectively. These coded logic gates have gating inputs coupled to the output of buffer amplifier 23 at terminal 29. In this case, the last three digits of the input codes are utilized to gate a corresponding logic gate which will allow one phase to pass through the particular logic gate to a buffer amplifier 66 and band-pass filter 67. Hence, it will be seen that there are four possible frequency outputs each of which has eight possible phases, all of which are determined by the combination of digital pulses stored in the five-digit read register 22 which, in turn, is derived from the teletype signal input. The four subfrequency oscillators 31, 32, 33 and 34 are synchronized with a master oscillator which is 1,020 Hz. oscillator 42. The output of this oscillator is coupled through buffer amplifier 43 to a Schmidt trigger 44, differentiator 47, 1,020 counter 51 and oscillator synchronizing gate 48. The output of 1,020 counter 51 is coupled to an input of oscillator synchronizing gate 48 to provide an output once per second to the four subfrequency oscillators 31, 32, 33 and 34 through oscillator synchronizing buffer 52 and to a 2,720 Hz. oscillator 69. The output of differentiator 47 is also utilized to operate sequential switch 21 through pulse width counter 49 and pulse synchronizing buffer 50. Pulse width counter 49 supplies a pulse to sequential switch 21 every 254 counts. Hence, the entire system is synchronized by 1.020 Hz. oscillator 42. The output of this oscillator is also coupled to terminal 46 through buffer amplifier 43. The 1,020 Hz. signal is then mixed with the output of the 2,720 Hz. oscillator 69 in the 2,720–1,105 Hz. mixer 68. The output of mixer 68 will then consist of, in this instance, the difference frequency between oscillator 69 which is 2,720 Hz. and oscillator 32 which is 1,095 Hz resulting in 1,625 Hz., and the difference frequency between oscillator 69 and the reference frequency 1,020 Hz. from oscillator 42, resulting in 1,700 Hz. These will then pass through 1,530–1,700 Hz. band-pass filter 71 and then are coupled for modulation to transmitter 73 through buffer amplifier 72. At the same time, the frequencies at specific phases resulting from a plurality of other channels can be coupled into buffer amplifier 72, as indicated, which can also modulate the carrier of transmitter 73.

Referring now to FIGS. 4 and 5, the receiving and decoding system will be described. The signals from transmitter 73 are received by a receiver 74 and coupled through buffer amplifier 76 to band-pass filter 77 and to other band-pass filters not shown. Band-pass filter 77 will then pass the transmitted modulation frequency 1,625 Hz. to mixer 78. The oscillator 98 being coupled to mixer 78 at 2,720 Hz. the initial subfrequency of 1,095 Hz. is restored which is passed through band-pass filter 82 and DC zero level restorer 83 to Schmidt trigger 84. The output of Schmidt trigger 84 is coupled to terminal 87 through buffer amplifier 86.

The frequency 1,700 Hz. is also passed through mixer 78 where it is mixed with the output of the 2,720 Hz. oscillator 98 to produce 1,020 Hz., which is the reference frequency. This signal is coupled to the high Q reference frequency filter 79 and locks in 1,020 Hz. locked-in oscillator 81, thus establishing a common phase reference with 1,020 Hz. oscillator 42 (FIG. 1) of the transmitter. The output of 1,020 Hz. locked-in oscillator 81 is coupled through buffer amplifier 88 to Schmidt trigger 89. This is differentiated at differentiator 91, passed through pulse width counter 94, the output of which is coupled to terminal 96. The output of differentiator 91 is also passed to 1,020 counter 93, the output of which is coupled to oscillator synchronizing gate 92, along with another output from differentiator 91. After 1,020 counts, i.e., one second, an output is coupled through oscillator synchronizing buffer 97 to 2,720 Hz. oscillator 98, locking it in phase with the 2,720 oscillator 69 (FIG. 3) of the transmitter which results in a synchronous phase at the output of mixer 78. The output of oscillator synchronizing buffer 97 is also coupled to terminal 99 which, in turn, synchronizes the phases of four subfrequency oscillators 1,075 Hz., 1,095 Hz., 1,115 Hz. and 1,135 Hz., 101, 102, 103 and 104, respectively, in FIG. 5. These subfrequency oscillators will then be synchronized in phase with the subfrequency oscillators 31, 32, 33, 34 (FIG. 2 of the transmitter section). Each of these oscillators will have a phase shift network coupled to its output, the one illustrated being the 1,095 Hz. oscillator 102 coupled to the input of phase shift network 106 which is identical to phase shift network 54 (FIG. 3) transmitter section. Phase shift network 106 also has eight outputs with a relative phase shifts of 0°, 45°, 90°, 135°, 180°, 225°, 270° and 315°. Each of these outputs is utilized to trigger a Schmidt trigger 107, 108, 109, 111, 112, 113, 114 and 116, respectively, and each Schmidt trigger has an output coupled to coincidence gates 117, 118, 119, 121, 122, 123, 124 and 126, respectively. These coincidence gates also have an input coupled to terminal 87. The coincidence gate representing a particular transmitted phase shift will see a greater degree of coincidence at its input and the integrator, in this case 133, will charge faster than the other integrators coupled to the other coincidence gates (not shown) and will reach the trigger level of, in this case, a maximum level Schmidt trigger 134, prior to the other integrators. Hence, the phase will be selected by the triggering of the corresponding Schmidt trigger, the output of which is, in turn, passed through inhibit buffer 136 which has seven outputs indicated by cable 141 coupled to the other phase channel inhibit buffers (not shown) to inhibit them before the inputs of their individual Schmidt triggers reach their level of triggering. Seven input lines shown at 139 from the other seven inhibit buffers would serve to inhibit this particular input buffer should one of the other channels be the proper phase. The output of inhibit buffer 136 is then coupled to a binary code generator which is preset and, in this case, is 01100 corresponding to the 01 of logic gate 26 (FIG. 2) and the 100 of logic gate 61 and passed into five-digit storage buffer 138. As indicated by inputs 142 and 143 and 144, three other five-digit storage buffer outputs are coupled into sequential switch 131 as anticipated by the four transmission inputs 11, 12, 13 and 14 of FIG. 2. The output from pulse width counter 94, coupled to terminal 96, is utilized to trigger Schmidt trigger 127, the output of which is differentiated in differentiator 128 and coupled to sequential switch 131 through pulse synchronizing buffer 129. This is identical to pulse width counter 49 in the receiver section in FIG. 2 which operates sequential switch 21 synchronizing the operation of the two sequential switches and reading out the five-digit storage buffers 138 (the other three not being shown) at terminals 146, 147, 148 and 149, as identical information to that presented at input terminals 11, 12, 13 and 14 in the transmitter section FIG. 2.

Hence, utilizing distinct frequencies with discrete phases, four teletype channels have been transmitted in the passband normally required for one at the same rate as one channel would normally be transmitted.

It should be understood, of course, that the foregoing disclosure relates to only a preferred embodiment of the invention and that it is intended to cover all changes and modifications of the example of the invention herein chosen for the purposes of the disclosure which do not constitute departures from the spirit and scope of the invention.

I claim:

1. A digital data condensation system for simultaneously transmitting and receiving a plurality of digital data signals comprising:

sequential switching means having a plurality of inputs adapted for coupling to a plurality of binary coded signals, said sequential switching means having an output;

a plurality of binary coded gating means corresponding to input signals each having an input coupled to said sequential switching means output;

a plurality of fixed frequency oscillators discretely separated in frequency, each having an inhibit input coupled to an output of a different one of said binary coded gating means;

a plurality of phase shift networks each having an input coupled to an output of a different one of said plurality of fixed frequency oscillators, each of said phase shaft networks having a plurality of outputs having a discrete phase relationship with any input thereof;

a second plurality of binary coded gating means each having a first input coupled to a separate one of said phase shift networks outputs and having a second input coupled to an output of said sequential switching means;

transmitting means coupled for modulation thereof to all of the outputs of said second plurality of binary coded gating means;

receiving means for receiving transmissions of said transmitting means, said receiving means having an output; and second converting means coupled to the output of said receiving means, said second converting means operable for converting periodic signal outputs of said receiving means to a plurality of binary coded signals having a code dependent upon the frequency and phase of said periodic signals.

2. The digital data condensation system of claim 1 wherein said second converting means comprises:

first pulse generating means coupled to the output of said receiving means;

a plurality of coincidence means each having one input coupled to the output of said first pulse generating means;

a second plurality of fixed frequency oscillators;

a second pulse generating means having an output coupled to an inhibit input of a second plurality of fixed frequency oscillators, said second plurality of fixed frequency oscillators having frequencies identical to the frequencies of the first plurality of fixed frequency oscillators;

synchronizing means coupled to said second pulse generating means for synchronizing said second pulse generating means with said first sequential switching means;

a second plurality of phase shift networks substantially identical to the plurality of phase shift networks each having an input connected to an output of a separate one of said second plurality of fixed frequency oscillators, each of said plurality of phase shift networks having a plurality of outputs having a discrete phase relationship with an input thereof;

a plurality of pulse generators each having an input coupled to a separate one of said phase shift network outputs, the outputs of said second plurality of pulse generators each coupled to a separate second input of said plurality of coincidence means;

each of said coincidence means having an output coupled to an input of a separate integrating level detecting means;

each of said separate integrating level detecting means coupled to a binary code generator; and the output of each of said binary code generators coupled to a separate input of a second sequential switching means, said second sequential switching means being coupled to said synchronizing means for reading out said binary codes in an identical sequence as said first sequential switching means.

3. The digital data condensation system of claim 1 wherein said second converting means comprises:

first pulse generating means coupled to the output of the said receiving means;

a plurality of coincidence means each having one input coupled to the output of said first pulse generating means;

a second plurality of fixed frequency oscillators;

a second pulse generating means having an output coupled to an inhibit input of a plurality of fixed frequency oscillators, said plurality of fixed frequency oscillators having frequencies identical to the frequencies of the first plurality of fixed frequency oscillators;

synchronizing means coupled to said second pulse generating means for synchronizing said second pulse generating means with said first sequential switching means;

a second plurality of phase shift networks substantially identical to the plurality of phase shift networks each having an input connected to an output of a separate one of said second plurality of fixed frequency oscillators, each of said plurality of phase shift networks having a plurality of outputs having a discrete phase relationship with an input thereof;
a plurality of pulse generators each having an input coupled to a separate one of said phase shift network outputs, the outputs of said second plurality of pulse generators each coupled to a separate second input of said plurality of coincidence means;
each of said coincidence means having an output coupled to an input of a separate integrating level detecting means;
each of said separate integrating level detecting means coupled to a binary code generator; and
the output of each of said binary code generators coupled to a separate input of a second sequential switching means, said second sequential switching means being coupled to said synchronizing means for reading out said binary codes in an identical sequence as said first sequential switching means.

4. A converter system for converting a plurality of binary coded signals into a plurality of periodic signals having a frequency and phase dependent upon the individual binary codes of the plurality of binary coded signals comprising:
a sequential switching means having a plurality of inputs adapted for coupling to a plurality of binary coded signals, said sequential switching means having an output;
a plurality of binary coded gating means each having an input coupled to said sequential switching means output;
a plurality of fixed frequency oscillators discretely separated in frequency each having an inhibit input coupled to an output of a different one of said binary coded gating means;
a plurality of phase shift networks each having an input coupled to an output of a different one of said plurality of fixed frequency oscillators, each of said phase shift networks having a plurality of outputs having a discrete phase relationship with an input thereof; and
a second plurality of binary coded gating means each having a first input coupled to a separate one of said phase shift networks outputs and having a second input coupled to an output of said sequential switching means.